United States Patent [19]

Lapp

[11] Patent Number: 5,147,736
[45] Date of Patent: Sep. 15, 1992

[54] METAL/AIR FUEL CELL WITH ELECTROLYTE FLOW EQUALIZATION MANIFOLD

[75] Inventor: Steven P. Lapp, Sydenham, Canada

[73] Assignee: Alcan International Limited, Montreal, Canada

[21] Appl. No.: 773,510

[22] Filed: Oct. 9, 1991

[51] Int. Cl.$^5$ .................. H01M 8/04; H01M 4/00
[52] U.S. Cl. ................................ 429/27; 429/14; 429/39
[58] Field of Search ................ 429/14, 39, 35, 27

[56] References Cited

U.S. PATENT DOCUMENTS

| | | | |
|---|---|---|---|
| 3,520,731 | 7/1970 | Rightmire et al. | 429/14 |
| 3,666,561 | 5/1972 | Chiku | 136/86 R |
| 4,210,512 | 7/1980 | Lawrance et al. | 429/39 X |
| 4,520,080 | 5/1985 | Hashimoto | 429/18 |
| 4,910,102 | 3/1990 | Rao et al. | 429/51 |
| 4,910,104 | 3/1990 | Rao et al. | 429/67 |

*Primary Examiner*—John S. Maples
*Attorney, Agent, or Firm*—Cooper & Dunham

[57] ABSTRACT

A manifold system is described for equalizing electrolyte flow to a plurality of metal/air cells of a fuel cell assembly. The fuel cell comprises: (a) a housing, (b) a plurality of metal/air cells disposed vertically in the housing, (c) air injection means for flowing oxidizing air between the metal/air cells, (d) an electrolyte storage tank, (e) a recirculation loop for continuously recirculating electrolyte from the storage tank through the metal/air cells, (f) an electrolyte inlet manifold forming part of said recirculation loop, said manifold comprising a large manifold tube extending horizontally beneath a plurality of said metal/air cells and a plurality of small feeder tubes extending horizontally, laterally from said large tube, each small feeder tube extending across beneath a single metal/air cell and flow connecting to the bottom of the cell, said large tube having a diameter sufficiently greater than the diameter of the small feeder tubes such that the total combined flow of all of the small feeder tubes does not cause a significant pressure drop in the large manifold tube. Each feeder tube has a length and diemeter to provide a friction pressure drop therethrough which is sufficiently high that the static pressure head difference due to elevation at the cell inlet between the lowest and highest cells in an inclined stack is very small compared to the pressure drop across each individual small feeder tube.

6 Claims, 3 Drawing Sheets

METAL/AIR FUEL CELL WITH ELECTROLYTE FLOW EQUALIZATION MANIFOLD

BACKGROUND OF THE INVENTION

The invention relates to metal/air fuel cells, and particularly to an electrolyte flow equalization manifold for such fuel cells having recirculating electrolyte Metal/air fuel cells or batteries produce electricity by the electro-chemical coupling of a reactive metallic anode to an air cathode through a suitable electrolyte in a cell. The air cathode is typically a sheet-like member, having opposite surfaces respectively exposed to air and to the aqueous electrolyte of the cell. During cell operation, oxygen is reduced within the cathode while metal of the anode is oxidized, providing a usable electric current flow through external circuitry connected between the anode and cathode. The air cathode must be permeable to air but substantially impermeable to aqueous electrolyte, and must incorporate an electrically conductive element to which the external circuitry can be connected. Present-day commercial air cathodes are commonly constituted of active carbon (with or without an added dissociation-promoting catalyst) in association with a finely divided hydrophobic polymeric material and incorporating a metal screen as the conductive element. A variety of anode metals have been used or proposed; among them, zinc, alloys of aluminum and alloys of magnesium are considered especially advantageous for particular applications, owing to their low cost, light weight and ability to function as anodes in metal/air fuel cells using a variety of electrolytes.

A typical aluminum/air cell comprises a body of aqueous electrolyte, a sheet-like air cathode having one surface exposed to the electrolyte and the other surface exposed to air, and an aluminum alloy anode member (e.g. a flat plate) immersed in the electrolyte in facing spaced relation to the first-mentioned cathode surface. A typical fuel cell unit or battery comprises a plurality of such cells.

Aqueous electrolytes for metal/air fuel cells consist of two basic types, namely a neutral-pH electrolyte and a highly alkaline electrolyte. The neutral-pH electrolyte usually contains halide salts and, because of its relatively low electrical conductivity and the virtual insolubility of aluminum therein, is used for relatively low power applications. The highly alkaline electrolyte usually consists of NaOH or KOH solution, and yields a higher cell voltage than the neutral electrolyte.

In alkaline electrolytes, the cell discharge reaction may be written:

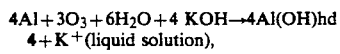

followed, after the dissolved potassium (or sodium) aluminate exceeds saturation level, by:

In addition to the above oxygen-reducing reactions, there is also an undesirable, non-beneficial reaction of aluminum in both types of electrolyte to form hydrogen, as follows:

Metal/air fuel cells are of particular interest as a fuel source for motorized vehicles and when they are used for this purpose they must be capable of being operated at an incline of at least 10° to the horizontal.

Typically, the problem of feeding a plurality of fuel cells simultaneously has been solved by creating a fluid-tight stack through which fluid can be forced such that the inclination of the stack of cells does not affect fluid flow. Such an arrangement leads to refuelling difficulties as the stack must be opened for refuelling which breaks the fluid-tight seals. A basic goal in the refuelling of aluminum/air fuel cells is that the refuelling must not require the use of fluid-tight pressure seals.

U.S. Pat. No. 3,666,561 issued May 30, 1972 describes an electrolyte recirculating battery having a plurality of cells in which electrolyte is flowed in through a main manifold tube, then up through individual tubes and out of the fuel cells through individual discharge tubes. Short connectors are used between the manifold tube and the individual cells.

U.S. Pat. No. 4,520,080 issued May 28, 1985 shows an arrangement of small tubes between fuel cells for absorbing small shunt electrical currents. However, this does not apply to a typical metal/air fuel cell, but relates to a design with separate cathode and anode electrolytes.

U.S. Pat. No. 4,910,102 issued Mar. 20, 1990 describes an electrolyte flow manifold for a metal/air cell in which the manifold arrangement is at the top of the cells and the flow is from the top downwardly through each cell.

None of the above designs is suitable for simple refuelling by replacement of anodes.

It is the object of the present invention to develop a metal/air fuel cell capable of being operated in an inclined position while maintaining substantially equal electrolyte flow to individual cells and providing shunt circuit protection.

SUMMARY OF THE INVENTION

The present invention in its broadest aspect relates to a metal/air fuel cell assembly comprising:

(a) a fuel cell assembly housing, (b) a plurality of metal/air cells disposed vertically in the housing, (c) air injection means for flowing air between the metal/air cells, (d) an electrolyte storage tank, (e) a recirculation loop for continuously recirculating electrolyte from the storage tank through the metal/air cells, (f) an electrolyte inlet manifold forming part of said recirculation loop, said manifold comprising a large manifold tube extending horizontally beneath a plurality of said metal/air cells and a plurality of small feeder tubes extending horizontally, laterally from said large tube, each small feeder tube extending across beneath a single metal/air cell and flow connecting to the bottom of the cell, said large tube having a diameter sufficiently greater than the diameter of the small feeder tubes such that the total combined flow of all of the small feeder tubes does not cause a significant pressure drop in the large manifold tube.

Each small feeder tube has a length and diameter such as to provide a friction pressure drop therethrough which is sufficiently high that the static pressure head difference due to elevation between the lowest and highest cells in an inclined stack is very small compared to the friction pressure drop across each individual small feeder tube. The cell stack is designed to continue operating at roll inclinations of up to 10 degrees. In a typical commercial operation, a large manifold tube extends horizontally across beneath 14 metal/air cells with 14 small feeder tubes extending horizontally, laterally from the manifold tube. A typical commercial manifold tube may have a diameter in the order of 15 to 30 mm, while the corresponding small feeder tubes may have diameters in the order of 2 to 5 mm and lengths in the order of 20 to 100 cm. By placing each small feeder tube horizontally directly beneath the fuel cell which it is feeding, there is a significant reduction in the shunt currents from cell to cell.

When using a feed manifold system according to the present invention, it is possible to use a refuelling arrangement such as that described in U.S. Ser. No. 774,185, Steven P. Lapp, "Refuelling Anode Assembly for Aluminum-Air Cells", (filed simultaneously herewith), incorporated herein by reference. Thus, the fuel cell housing may be of an open top design and a refuelling anode assembly can simply be set in place in the housing with only a sponge gasket. It is, therefore, an important feature of the present invention that the need for fluid-tight cell top seals is eliminated and the open tops of the cells are available for refuelling without disassembling the fuel cell stack.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF THE PREFERRED EMBODIMENTS

The present invention is particularly useful in an electrolyte circulation system for an aluminum/air fuel cell.

Figure 1:
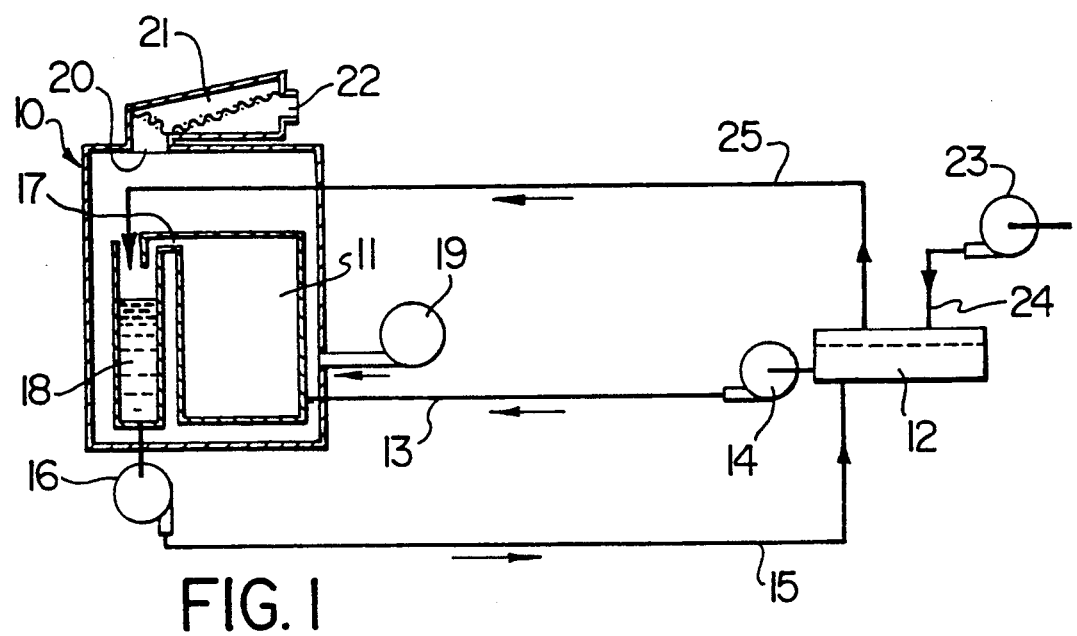
FIG. 1 is a schematic flow diagram illustrating a system within which this invention can be used.

A typical flow sheet for a system to which the present invention can be applied is shown in FIG. 1. This shows a main fuel cell case or housing 10 containing aluminum/air fuel cell stacks 11. Alkaline electrolyte, e.g. a solution of NaOH or KOH, is stored in storage tank 12 and is pumped via inlet line 13 and pump 14 into the bottom of the aluminum/air cells. The used electrolyte is returned via electrolyte return line 15 and recycle pump 16. Air is fed to the fuel cell stacks 11 by an air feed pump 19.

The fuel cell generates hydrogen and some of this is trapped in the electrolyte in the form of very small bubbles. A mixture of electrolyte and hydrogen discharges through top outlet 17 into an electrolyte/gas separator or degassing vessel 18. The electrolyte is largely degassed in this vessel with the separating hydrogen passing upwardly through an open top. It proceeds through outlet 20 and into a filter assembly 21 for removing caustic mist and caustic droplets with hydrogen and air substantially free of caustic being discharged to the atmosphere through discharge outlet 22.

The electrolyte in the degassing vessel 18 continues to contain some residual hydrogen in the form of very small bubbles and this is carried back to reservoir 12 through return line 15. In the reservoir, the hydrogen gradually separates from the liquid. In order to keep the concentration of hydrogen in the space above the electrolyte in storage tank 12 below about 2% by volume, purge air is pumped into the top of tank 12 by way of air pump 23 and air line 24. This purge air dilutes and collects hydrogen from tank 12 and this mixture then passes via purge line 25 back to the degassing vessel 18.

This degassing vessel 18 is also bathed in a stream of air originating from air feed 19 and exhausting from the aluminum/air cells 11 and the air which is discharged through outlet 20 is a mixture of the air exhausting from the aluminum/air cells 11 and the purge air from line 25.

The electrolyte flow system of the present invention will now be described in greater detail with reference to FIGS. 2 to 5. As can be seen from FIGS. 2 and 3, the fuel cell housing 10 contains 4 stacks of aluminum/air cells with each stack containing 14 such aluminum/air cells thereby providing a total of 56 cells in the complete fuel cell assembly. In this particular unit, each anode has an area of approximately 950 $cm^2$ and the electrolyte circulates at a rate of about 25 1/min, giving a total power output of about 8 Kw.

The fuel cell housing 10 includes a bottom wall 30, side walls 31, end walls 33 and an open top. These are made from a chemical resistant plastic material, such as polyvinylchloride or polyphenylene oxide. The aluminum/air cells 35 are each made up of cathode walls 36 with air gaps 37 therebetween for the passage of oxidizing air. The cathode walls 36 also form therebetween electrolyte passages 38 through which electrolyte moves from bottom to top. Each of these electrolyte passages 38 contains an aluminum anode 39 which is mounted at the top end thereof to top wall 32 with an electrical connector 65 passing from each anode 39 up through the top wall 32 and connecting to an anode busbar 40. The electrical connection to the cathodes is made by way of cathode connector tabs 41.

The anodes 39 and top wall 32 are preferably in the form of a refuelling anode assembly as described in U.S. Ser. No. 774,185, Steven P. Lapp, "Refuelling Anode Assembly For Aluminum-Air Fuel Cells" (filed simultaneously herewith), incorporated herein by reference. Each refuelling assembly is intended to fuel one stack of aluminum-air cells and thus comprises fourteen anode plates 39 connected to a top wall 32 by way of conductive screws 65. Mounted on the top edge of each anode plate 39 is a U-shaped caustic-resistant plastic cap 66 to prevent any of the electrolyte from coming in contact with the top edge of the anode. Each refuelling assembly is inserted into a cell stack through the open top of housing 10 with the anode plates 39 extending into the cells and the top wall 32 resting on a sponge gasket 67. This provides a sufficient fluid seal for the operation of the system.

The electrolyte being pumped from the reservoir 12 enters the fuel cell via inlet 42 and it travels along large manifold tube 43 in the bottom region of the housing. Extending laterally from this manifold tube 43 are a series of small feeder tubes 44 with one of these flow tubes being used for each aluminum/air cell as can be seen from FIG. 5. The electrolyte enters each aluminum/air cell by way of individual flow passages 45.

Figure 2:
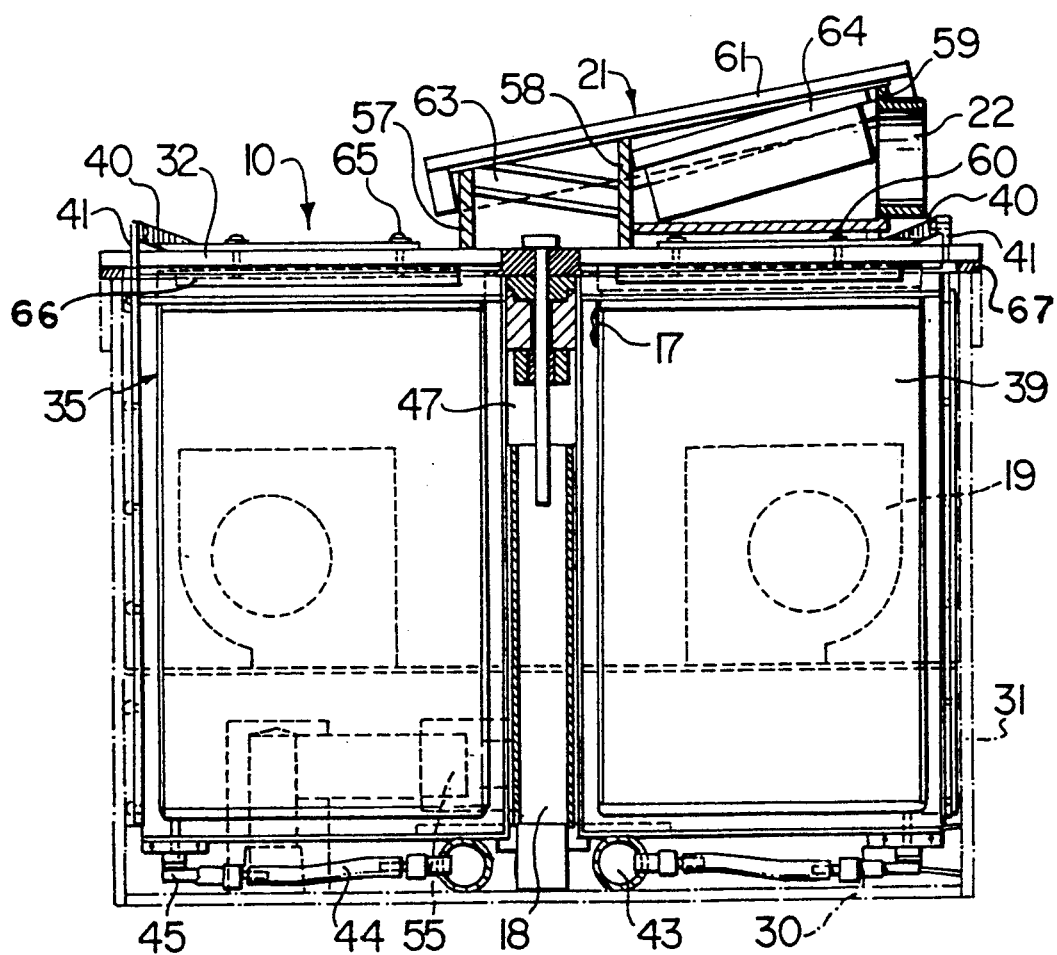
FIG. 2 is an end elevation in partial section showing a fuel cell incorporating this invention.
Figure 3:
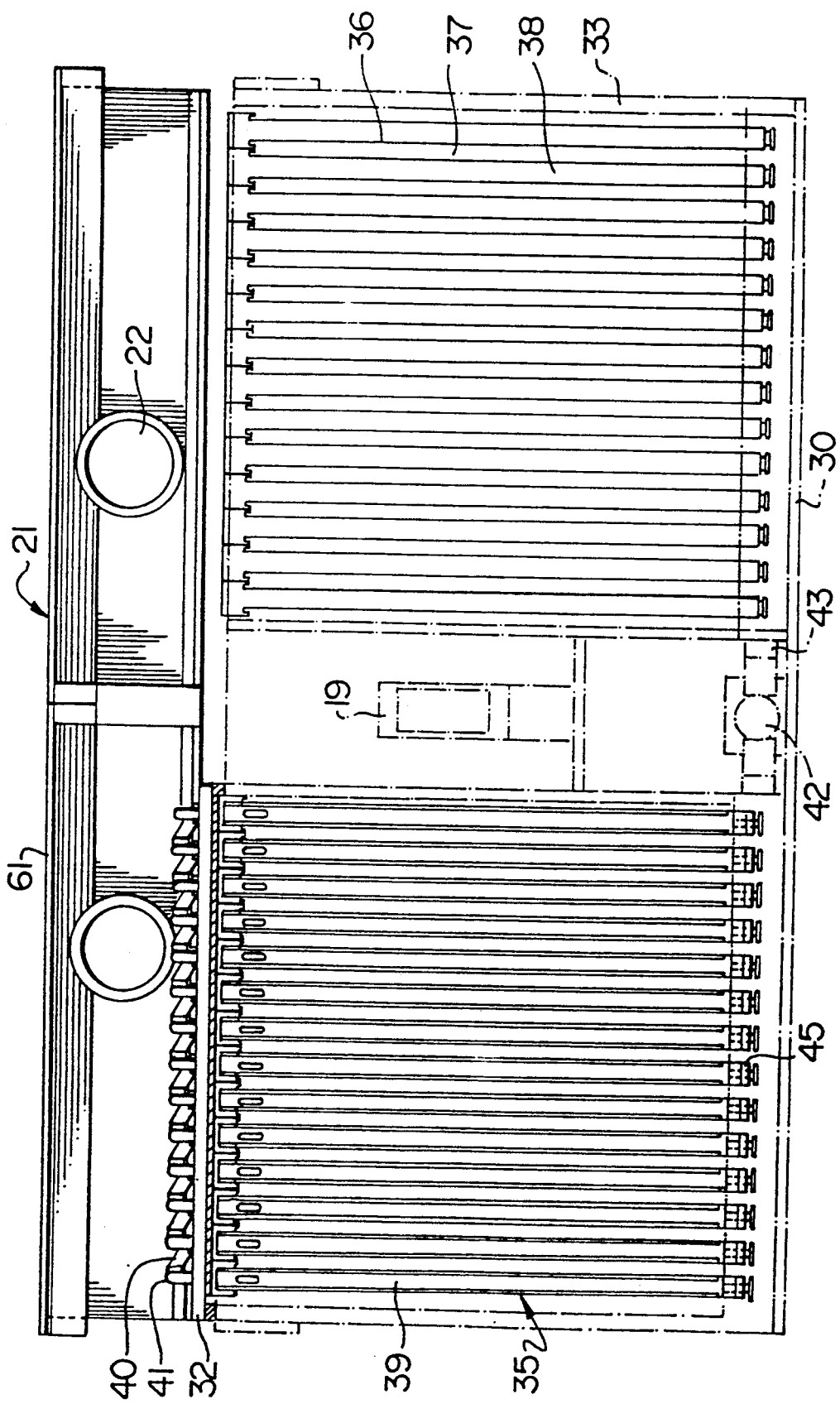
FIG. 3 is a side elevation in partial section showing the fuel cell of FIG. 2.
Figure 4:
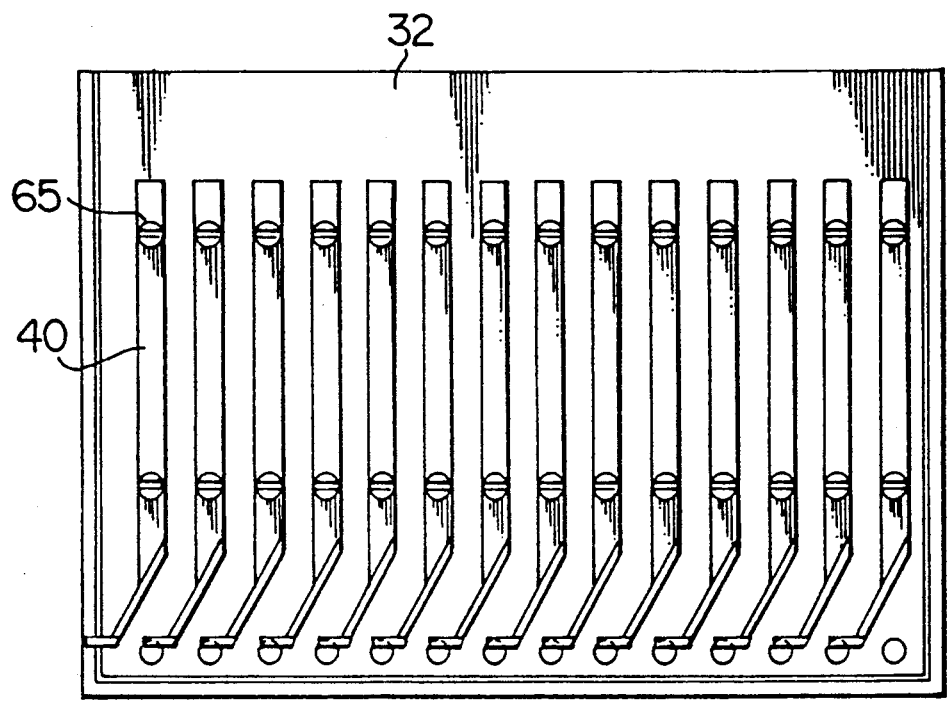
FIG. 4 is a top plan view of a refuelling rack.
Figure 5:
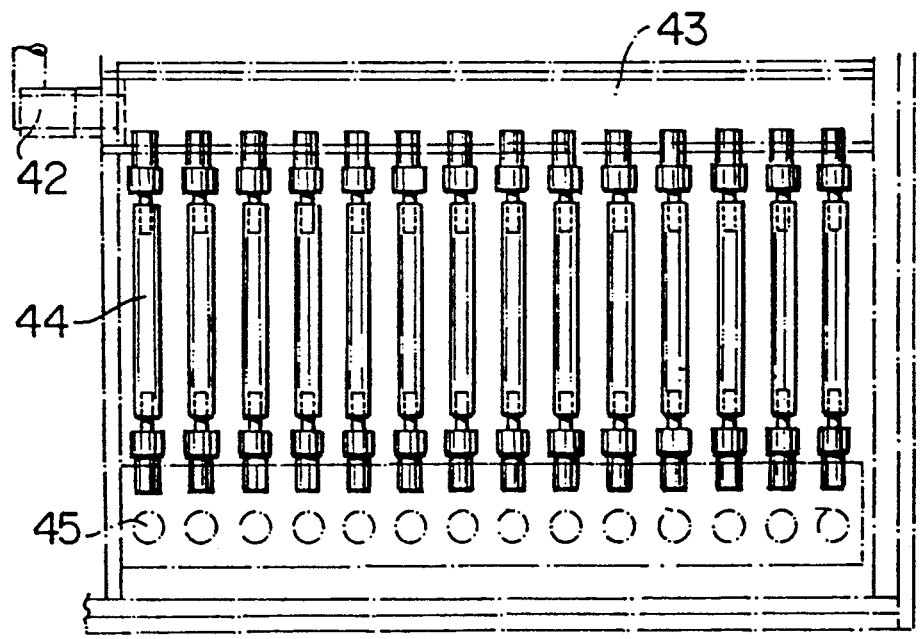
FIG. 5 is a partial sectional view showing the electrolyte feed arrangement of this invention.

As can be seen from FIGS. 2 and 5, each small feeder tube 44 extends across directly beneath each fuel cell. Thus, the manifold tube 43 is adjacent the inner corners of the cells in a stack and each flow connector 45 is at an opposite bottom corner of each cell with the small feeder tube 44 extending therebetween.

As shown in FIG. 2, the used electrolyte and hydrogen gas discharge through top outlet 17 and into electrolyte/gas separator or degassing vessel 18. The numeral 47 represents a discharge outlet for a mixture of air, hydrogen, caustic mist and caustic particles rising from the degassing vessel 18. This passes upwardly and then through an exhaust filter 21 mounted on top of the fuel cell housing 10.

This filter 21 includes side walls 57 and 59, an intermediate wall 58, a bottom wall 60 between walls 58 and 59 and an inclined top wall 61. The exhaust gases enter between walls 57 and 58 and the clean air and gas being discharged exits through outlets 22. The inlet portion includes a filter 63 made of pads of 3M Scotchbrite® material for filtering out caustic droplets and an automotive air intake paper filter 64 for removing any fine mist. The gases being discharged through outlet 22 contain little or no caustic mist or droplets.

From the above description of a preferred embodiment of the invention, those skilled in the art will perceive improvements, changes and modifications. Such improvements, changes and modifications within the skill of the art are intended to be covered by the appended claims.

I claim:
1. A fuel cell assembly comprising:
   (a) a housing,
   (b) a plurality of metal/air cells disposed vertically in the housing,
   (c) air injection means for flowing oxidized air between the metal/air cells,
   (d) an electrolyte storage tank,
   (e) a recirculation loop for continuously recirculating electrolyte from the storage tank through the metal/air cells,
   (f) an electrolyte inlet manifold forming part of said recirculation loop, said manifold comprising a large manifold tube extending horizontally beneath a plurality of said metal/air cells and a plurality of small feeder tubes extending horizontally, laterally from said large tube, each small feeder tube extending across beneath a single metal/air cell and flow connecting to the bottom of the cell, said large tube having a diameter sufficiently greater than the diameter of the small feeder tubes such that the total combined flow of all of the small feeder tubes does not cause a significant pressure drop in the large manifold tube.
2. A fuel cell according to claim 1 wherein each small feeder tube has a length and diameter to provide a friction pressure drop therethrough which is sufficiently high that the static pressure head difference due to elevation at the cell inlet between the lowest and highest cells in an inclined cell stack is very small compared to the friction pressure drop across each individual small feeder tube.
3. A fuel cell according to claim 1 wherein the metal/air cells are aluminum-air cells.
4. A fuel cell according to claim 3 wherein the aluminum comprises aluminum anode plates.
5. A fuel cell according to claim 4 wherein the anode plates are in the form of a refuelling anode assembly comprising:
   (a) a non-conducting plastic top cover plate for fuel cells,
   (b) a plurality of aluminum or aluminum alloy anode plates extending downwardly from said cover plate in vertical, equally spaced arrangement,
   (c) a U-shaped caustic-resistant plastic cap sealingly mounted on the top edge of each anode plate,
   (d) electrically conductive fasteners extending through said non-conducting cover plate and into said anode plates to securely hold the anode plates snugly against said cover plate, and
   (e) electrical conducting means on the top of the cover plate connected to said conductive fasteners.
6. An aluminum-air fuel cell assembly comprising:
   (a) a fuel cell assembly housing having closed side and bottom walls and an open top,
   (b) a plurality of vertical, equally spaced cells in said housing comprising caustic electrolyte cells between air cathodes and air gaps between the faces of the air cathodes remote from said electrolyte,
   (c) means for moving air through said air gaps and for moving caustic electrolyte through said electrolyte cells, said means for moving caustic electrolyte comprising a recirculation loop for continuously recirculating electrolyte from a storage and through the metal/air cells by way of a manifold including a large manifold tube extending horizontally beneath a plurality of said metal/air cells and a plurality of small feeder tubes extending horizontally, laterally from said large tube, each small feeder tube extending across beneath a single metal/air cell and flow connecting to the bottom of the cell, said large tube having a diameter sufficiently greater than the diameter of the small feeder tubes such that the total combined flow of all of the small feeder tubes does not cause a significant pressure drop in the large manifold tube,
   (d) a refuelling anode assembly mounted on said housing open top, said anode assembly comprising a non-conducting plastic top cover plate, a plurality of aluminum or aluminum alloy anode plates extending downwardly from said cover plate in vertical, equally spaced arrangement and into corresponding housing electrolyte cells, electrical conducting means extending through said cover plate and connecting to said anode plates.

* * * * *